(12) United States Patent
Disharoon

(10) Patent No.: US 9,341,203 B1
(45) Date of Patent: May 17, 2016

(54) RELEASABLE CLIP

(71) Applicant: Brian K. Disharoon, Virginia Beach, VA (US)

(72) Inventor: Brian K. Disharoon, Virginia Beach, VA (US)

( * ) Notice: Subject to any disclaimer, the term of this patent is extended or adjusted under 35 U.S.C. 154(b) by 174 days.

(21) Appl. No.: 13/934,768

(22) Filed: Jul. 3, 2013

(51) Int. Cl.
*F16B 2/22* (2006.01)

(52) U.S. Cl.
CPC ...................... *F16B 2/22* (2013.01)

(58) Field of Classification Search
CPC ... Y10T 24/44897; B65D 67/00; G03D 13/02
USPC .................................. 24/552, 598.5
See application file for complete search history.

(56) References Cited

U.S. PATENT DOCUMENTS

| | | | | |
|---|---|---|---|---|
| 159,403 | A * | 2/1875 | Foster ........................... | 24/598.6 |
| 581,250 | A | 4/1897 | McCawley | |
| 656,114 | A | 8/1900 | Hayes | |
| 749,429 | A * | 1/1904 | Dustinberre ................... | 24/552 |
| 872,934 | A * | 12/1907 | Harig .......................... | 43/42.74 |
| 1,118,825 | A | 11/1914 | Sohm | |
| 1,735,787 | A | 11/1929 | Peterson | |
| 1,764,833 | A * | 6/1930 | Forget ........................ | 24/546 |
| 1,892,678 | A | 1/1933 | McIntyre et al. | |
| 2,342,078 | A * | 2/1944 | Jones ......................... | 70/456 R |
| 2,484,449 | A * | 10/1949 | Fetterman .................... | 256/57 |
| 2,518,179 | A | 8/1950 | Quinby et al. | |
| 2,637,088 | A * | 5/1953 | Foster ........................ | 24/598.5 |
| 2,700,809 | A | 2/1955 | Caldwell | |
| 2,781,566 | A * | 2/1957 | Hammer ................... | B42F 1/08 |
| | | | | 24/546 |
| 3,241,201 | A | 3/1966 | Chester | |
| 3,333,307 | A | 8/1967 | Wheeler | |
| 3,545,049 | A * | 12/1970 | Brueggeman ................. | 24/598.5 |
| 3,633,253 | A | 1/1972 | Ellis | |
| 4,759,103 | A | 7/1988 | Henderson | |
| 4,777,950 | A * | 10/1988 | Kees, Jr. ............ | A61B 17/1227 |
| | | | | 24/546 |
| 4,811,470 | A | 3/1989 | Van Sloun | |
| 4,943,298 | A * | 7/1990 | Fujita .................. | A61B 17/1227 |
| | | | | 606/151 |
| 4,966,603 | A * | 10/1990 | Focelle .............. | A61B 17/1227 |
| | | | | 227/902 |
| 5,042,191 | A * | 8/1991 | Fett ............................. | 43/44.83 |
| 5,636,413 | A | 6/1997 | Berg et al. | |
| 5,979,021 | A * | 11/1999 | Swift ............................ | 24/66.6 |
| 6,240,604 | B1 * | 6/2001 | Fox .............................. | 24/429 |
| 6,243,922 | B1 | 6/2001 | Simon | |
| 6,290,575 | B1 * | 9/2001 | Shipp ................. | A61B 17/1285 |
| | | | | 451/28 |
| 6,412,152 | B1 * | 7/2002 | Ayliffe et al. ................ | 24/598.5 |
| 6,652,545 | B2 * | 11/2003 | Shipp ................. | A61B 17/1285 |
| | | | | 606/143 |
| 6,722,079 | B2 | 4/2004 | Schumer | |
| 6,792,653 | B2 | 9/2004 | Protz | |
| 7,207,997 | B2 * | 4/2007 | Shipp ................. | A61B 17/1285 |
| | | | | 606/143 |

(Continued)

FOREIGN PATENT DOCUMENTS

GB 2281340 1/1995

*Primary Examiner* — Robert J Sandy
*Assistant Examiner* — Rowland Do
(74) *Attorney, Agent, or Firm* — Shaddock Law Group, PC

(57) ABSTRACT

A releasable clip that includes a coil, a first arm portion, and a second arm portion. The arm portions initially extend from the coil in substantially parallel planes, each arm portion initially extends away from a longitudinal axis of the releasable clip, and each arm portion extends from the coil to a respective shoulder portion. A first leg portion and a second leg portion, each leg portion extends from a respective shoulder portion, and each leg portion initially extends toward and crosses the longitudinal axis of the releasable clip. A first arch portion and a second arch portion, wherein each arch portion extends from a respective leg portion to a respective terminal end.

19 Claims, 6 Drawing Sheets

(56) References Cited

U.S. PATENT DOCUMENTS

| | | |
|---|---|---|
| 7,496,991 B2 | 3/2009 | Avery |
| D595,936 S | 7/2009 | Love |
| 7,678,125 B2 * | 3/2010 | Shipp .................. A61B 17/083 24/567 |
| 7,721,392 B2 | 5/2010 | Avery |
| D661,978 S | 6/2012 | Holechek |
| 8,276,853 B2 | 10/2012 | Murphy |

\* cited by examiner

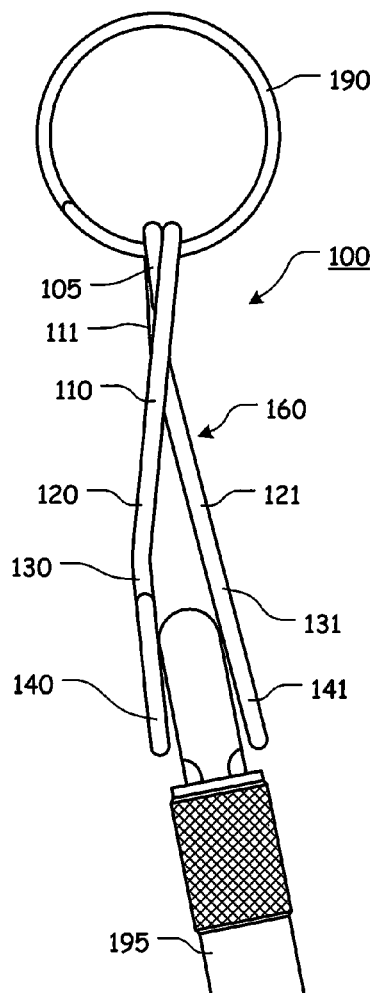
FIG. 10
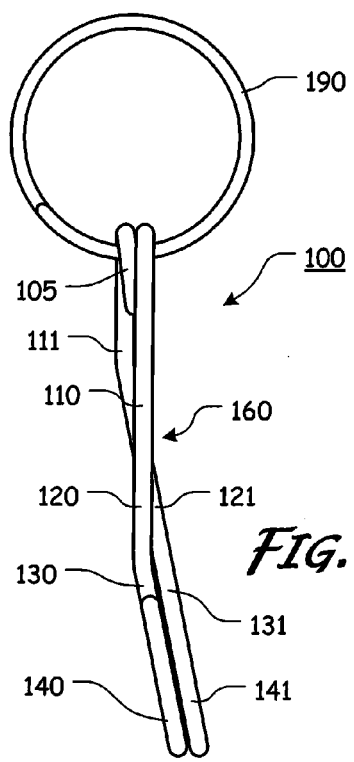
FIG. 11
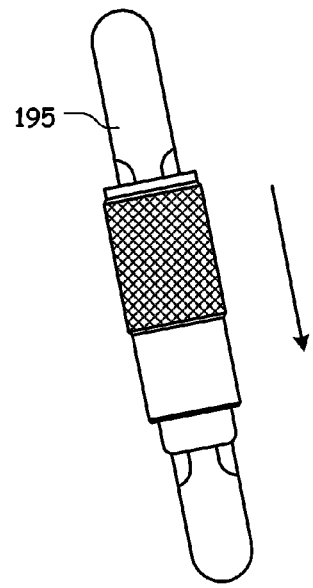

RELEASABLE CLIP

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING

Compact Disc Appendix

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to the field of clips and quick links. More specifically, the present invention relates to a releasable clip to aid in the connection of items.

2. Description of Related Art

It is often desirable to have certain items or devices attached to clothing or gear so that they are easily accessible and/or usable. D-clips or carabiners are typically used to attach items or devices clothing or gear.

Once items are attached, they typically do not separate easily. In fact, typical attachment devices are created such that once items are attached, deliberate actions are required to release the items from the attachment device. Typically, these actions require the weight or load up an attached item to be removed from the attachment device for the item can be removed.

It is also generally required that that the attached item in the attachment device be repositioned relative to one another for items to be unattached.

Unfortunately, because multiple actions are typically required to remove items from attachment devices, once an item is attached to clothing or gear using done attachment devices, the item can easily become an entanglement hazard for the wearer.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

Attaching items or devices to clothing or gear using typical connectors (i.e., D-clips or carabiners) is generally a slow and deliberate process.

The potential invention is a releasable clip that can be used to attach items, but will not cause entanglement issues because items can be pulled from the releasable clip provided a sufficient pulling force is applied to the attach item(s).

In various exemplary, non-limiting embodiments, the releasable clip includes a coil; a first arm portion and a second arm portion, wherein the arm portions initially extend from the coil in substantially parallel planes, and wherein each arm portion initially extends away from a longitudinal axis of the releasable clip, and wherein each arm portion extends from the coil to a respective shoulder portion; a first leg portion and a second leg portion, wherein each leg portion extends from a respective shoulder portion, wherein each leg portion initially extends toward and crosses the longitudinal axis of the releasable clip; and a first arch portion and a second arch portion, wherein each arch portion extends from a respective leg portion to a respective terminal end.

In one embodiment, the releasable clip comprises a 1"×¾" bent piece of metal, which releases and attached item when pressure is pulled against the mouth of the releasable clip, but will spring back into position so as to be used over and over again.

In still other exemplary, nonlimiting, embodiments, the releasable clip includes an elongate wire-like element extending from a first terminal end to a second terminal end; a coil formed in the elongate wire-like element, wherein a first arm portion and a second arm portion initially extend from the coil, and wherein each arm portion initially extends away from a longitudinal axis of the releasable clip, wherein after extending a determined second distance from the coil, the first arm portion bends away from a first plane and extends along a second plane, wherein after extending a determined first distance from the coil, the second arm portion bends away from a plane substantially parallel to the first plane and extends along a plane substantially parallel to the second plane, and wherein the first arm portion extends to a first shoulder portion and the second arm portion extends to a second shoulder portion; wherein a first leg portion extends from the first shoulder portion and a second leg portion extends from the second shoulder portion, wherein each leg portion initially extends toward and crosses the longitudinal axis of the releasable clip; and a first arch portion extending from the first leg portion to the first terminal end and a second arch portion extending from the second leg portion to the second terminal end.

Thus, the present invention allows a user to wear items that are considered important or essential, but without causing entanglement issues. When gear is attached using the releasable clip of the present invention, a downward pull on an attached item allows the item to be released from the releasable clip.

Accordingly, the presently disclosed invention provides a releasable clip that allows a user to releasably secure one or more items.

The presently disclosed invention separately provides a releasable clip that allows attached items to be released without applying excessive force.

The presently disclosed invention separately provides a releasable clip that can be provided in various sizes.

The presently disclosed invention separately provides a releasable clip that can be provided in various strengths, allowing items to be released at various pull weights.

The presently disclosed invention separately provides a releasable clip that can be easily manipulated by a user.

These and other features and advantages of the presently disclosed releasable clip are described in or are apparent from the following detailed description of the exemplary, non-limiting embodiments.

BRIEF DESCRIPTION OF THE SEVERAL VIEWS OF THE DRAWINGS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein:

FIG. 10 shows a left side view of a first exemplary embodiment of releasable clip, wherein an exemplary ring is attached to the releasable clip and the carabiner is rotated and pulled to move the releasable clip to an open position, according to this invention; and FIG. 11 shows a left side view of a first exemplary embodiment of releasable clip, wherein an exemplary ring is attached to the releasable clip, the carabiner has been pulled from the releasable clip, and the releasable clip has returned to a closed position, according to this invention.

DETAILED DESCRIPTION OF THE INVENTION

Figure 1:
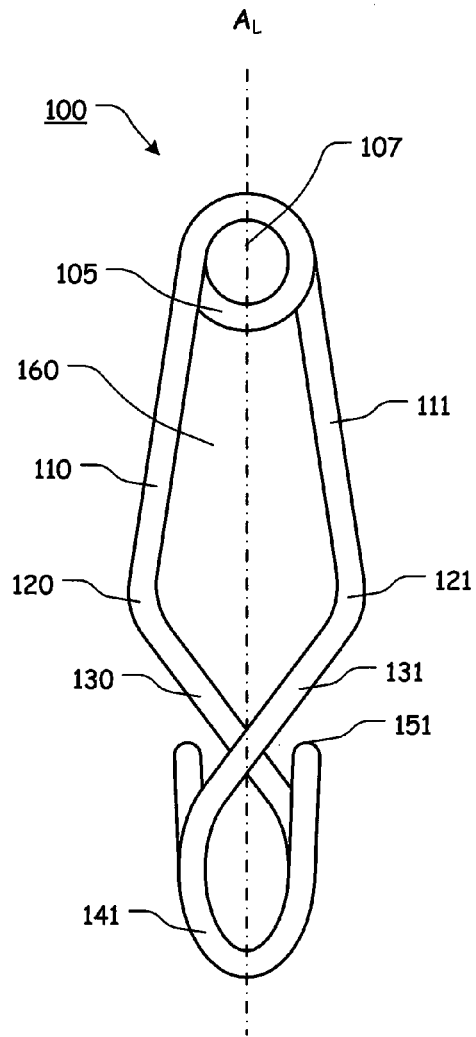
FIG. 1 shows a front view of a first exemplary embodiment of releasable clip, according to this invention.

For simplicity and clarification, the design factors and operating principles of the releasable clip of this invention are explained with reference to various exemplary embodiments of the releasable clip, according to this invention. The basic explanation of the design factors and operating principles of the releasable clip is applicable for the understanding, design, and operation of the releasable clip of this invention. It should be appreciated that the releasable clip can be adapted to many applications where one or more items are to be attached either together or to other items.

It should also be appreciated that the terms "clip" and "releasable clip" are used for basic explanation and understanding of the operation of the systems, methods, and apparatuses of this invention. Therefore, the terms "clip" and "releasable clip" are not to be construed as limiting the systems, methods, and apparatuses of this invention. Thus, the terms "clip" and "releasable clip" are to be understood to broadly include any structures or devices capable of releasably attaching two a more items.

For simplicity and clarification, the releasable clip of this invention will be described as being attached to an exemplary ring and carabiner. However, it should be appreciated that these are merely exemplary items and are not to be construed as limiting this invention. Thus, the releasable clip of this invention may be utilized to attach two or more items for any application.

Throughout this application the word "comprise", or variations such as "comprises" or "comprising" are used. It will be understood that these terms are meant to imply the inclusion of a stated element, integer, step, or group of elements, integers, or steps, but not the exclusion of any other element, integer, step, or group of elements, integers, or steps.

Turning now to the drawing Figs., FIGS. 1-11 show certain elements and/or aspects of a first exemplary embodiment of the releasable clip 100, according to this invention. In illustrative, non-limiting embodiment(s) of this invention, as illustrated in FIGS. 1-11, the releasable clip 100 comprise at least some of a coil 105, a first arm portion 110, a second arm portion 111, a first shoulder portion 120, a second shoulder portion 121, a first leg portion 130, a second leg portion 131, a first arch portion 140, and a second arch portion 141.

In various exemplary embodiments, the releasable clip 100 comprises an elongate portion of material extending from a first terminal end 150 to a second terminal end 151. The releasable clip 100 may comprise an elongate wire-like element having spring or rebounding properties. Alternatively, the releasable clip 100 may comprise two or more elongate portions of material attached, coupled, or otherwise joining together to form the releasable clip 100.

The coil 105 comprises a loop of material, formed so as to define a coil loop 107.

Figure 2:
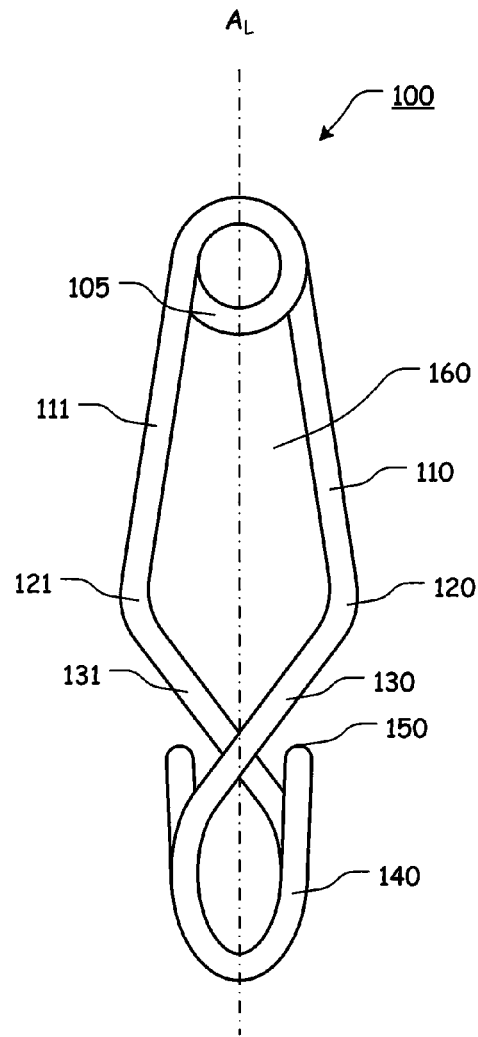
FIG. 2 shows a rear view of a first exemplary embodiment of releasable clip, according to this invention.
Figure 5:
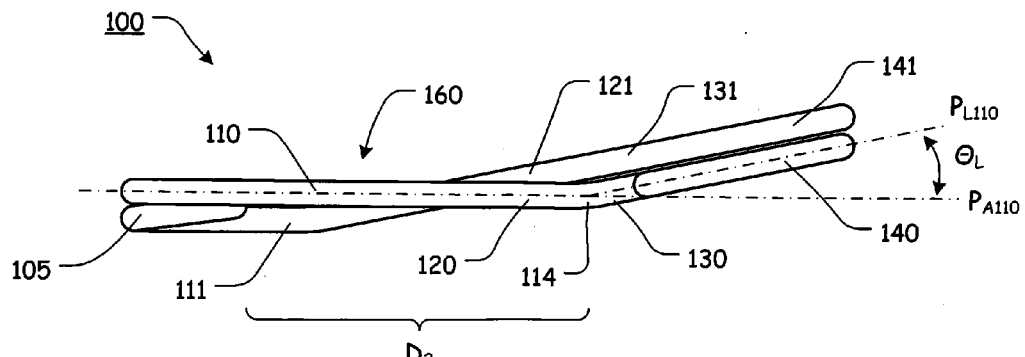
FIG. 5 shows a left side view of a first exemplary embodiment of releasable clip, wherein the releasable clip is in a closed position, according to this invention.
Figure 6:
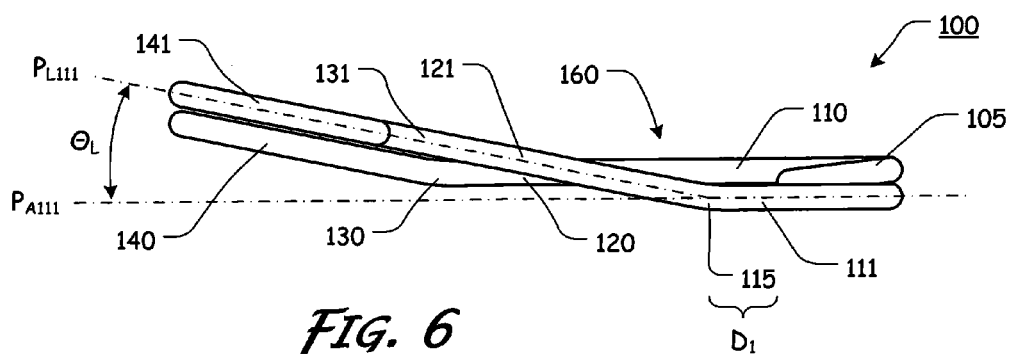
FIG. 6 shows a right side view of a first exemplary embodiment of releasable clip, wherein the releasable clip is in a closed position, according to this invention.

Each of the arm portions 110 and 111 extends from the coil 105 to a shoulder portion 120 and 121, respectively. Arm portion 110 and arm portion 111 each initially extend from the coil 105 in substantially parallel planes $P_{A110}$ and $P_{A111}$, as illustrated in FIGS. 5 and 6. Additionally, arm portion 110 and arm portion 111 each initially extend from the coil 105 and away from a longitudinal axis $A_L$ of the releasable clip 100, as illustrated in FIGS. 1 and 2. When the arm portions 110 and 111 reach shoulder portions 120 and 121, respectively, arm portion 110 transitions to leg portion 130 and arm portion 111 transitions to leg portion 131.

In certain exemplary embodiments, a length of arm portion 110 is equal to a length of arm portion 111. Alternatively, the length of arm portion 110 may be greater than or less than the length of arm portion 111.

As leg portions 130 and 131 extend from the shoulder portions 120 and 121, respectively, leg portions 130 and 131 initially extend toward the longitudinal axis $A_L$ of the releasable clip 100, as further illustrated in FIGS. 1 and 2. Leg portions 130 and 131 continue to extend from shoulder portions 120 and 121, respectively, and cross one another and the longitudinal axis $A_L$ of the releasable clip 100.

After having crossed the longitudinal axis $A_L$ of the releasable clip 100, leg portion 130 transitions to arc 140, while leg portion 131 transitions to arc 141. Arcs 140 and 141 extended to form terminal ends 150 and 151 of the releasable clip 100.

In certain exemplary embodiments, a length of leg portion 130 is equal to a length of leg portion 131. Alternatively, the length of leg portion 130 may be greater than or less than the length of leg portion 131.

An area between a portion of the coil 105, arm portion 110 and 111, and portions of leg portions 130 and 131 defines a primary loop 160.

As shown most clearly in FIGS. 5 and 6, after extending for a determined first distance $D_1$ from the coil 105, the arm portion 111 reaches bend 115 where arm portion 111 bends away from the plane $P_{A111}$ and extends along a plane $P_{L111}$.

Likewise, after extending for a determined second distance $D_2$ from the coil 105, the arm portion 110 reaches bend 114 where arm portion 110 bends away from the plane $P_{A110}$ and extends along a plane $P_{L110}$.

Plane $P_{A111}$ intersects plane $P_{L111}$ at bend 115, such that Plane $P_{A111}$ intersects plane $P_{L111}$ at an angle $\theta_L$. Likewise, plane $P_{A110}$ intersects plane $P_{L110}$ at bend 115, such that plane $P_{A110}$ intersects plane $P_{L110}$ at an angle $\theta_L$. In certain exemplary embodiments, angle $\theta_L$ is approximately 11°. In other exemplary, nonlimiting embodiments, angle $\theta_L$ is between approximately 5° and 20°. In still other exemplary, nonlimiting embodiments, angle $\theta_L$ is between approximately 2° and 30°.

Based on the formation of the various components of the releasable clip 100, plane $P_{A110}$ is substantially parallel to plane $P_{A111}$ and plane $P_{L110}$ is substantially parallel to plane $P_{L111}$. Additionally, because of the positioning of bends 114 and 115, at least portions of arch portions 140 and 141 follow substantially parallel planes $P_{L110}$ and $P_{L111}$.

In various exemplary, nonlimiting embodiments, the components of the releasable clip 100 are formed of a spring or other resilient material, so as to provide a springing or rebounding force to elements of the releasable clip 100. In this manner, at least portions of the arm portions 110 and 111 and leg portions 130 and 131 can be urged away from one another to an open position, as illustrated most clearly in FIG. 7, and then automatically return to a closed position. Typically, but not exclusively, the entire releasable clip 100 is formed of a spring or other resilient material. Optionally, certain components, such as, for example, the coil loop 105 and/or portions of the arm portions 110 and 111 may be the only components formed of a spring or other resilient material.

In various exemplary embodiments, various components of the releasable clip 100 are substantially rigid and are formed of stainless steel. Alternate materials of construction of the various components of the releasable clip 100 may include one or more of the following: steel, aluminum, titanium, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, or polymer fiber reinforced plastics, thermoform and/or thermoset materials, and/or various combinations of the foregoing. Thus, it should be understood that the material or materials used to form the various components of the releasable clip 100 is a design choice based on the desired appearance and functionality of the releasable clip 100.

It should also be appreciated that certain elements of the releasable clip 100 may be formed as an integral unit. Alternatively, suitable materials can be used and sections or elements made independently and attached, coupled, or joined together, such as by adhesives, welding, screws, rivets, pins, or other fasteners, to form the various elements of the releasable clip 100.

It should also be understood that the overall size and shape of the releasable clip 100, and the various portions thereof, is a design choice based upon the desired functionality and/or appearance of the releasable clip 100.

FIGS. 8-11 illustrate an exemplary use of the releasable clip 100. During use, a first item, such as exemplary ring 190 can be releasably or permanently attached to the releasable clip 100, via insertion through coil loop 107. In various exemplary embodiments, the releasable clip 100 may be attached to an item or may be attached or coupled to an article (i.e., an article of clothing, a piece of strap or webbing, etc.) via the coil loop 107.

Figure 3:
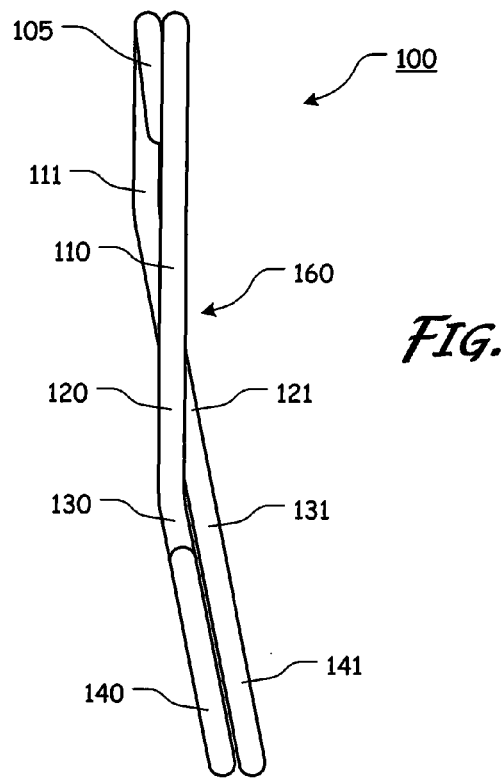
FIG. 3 shows a left side view of a first exemplary embodiment of releasable clip, according to this invention.
Figure 4:
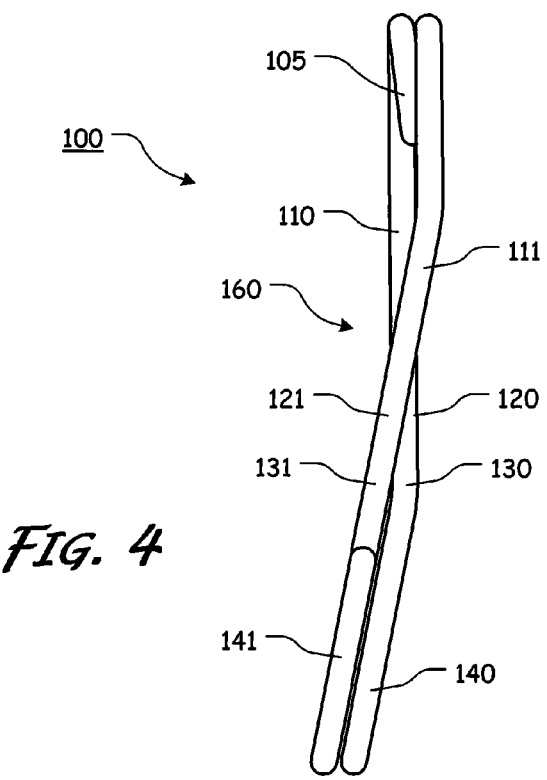
FIG. 4 shows a right side view of a first exemplary embodiment of releasable clip, according to this invention.
Figure 7:
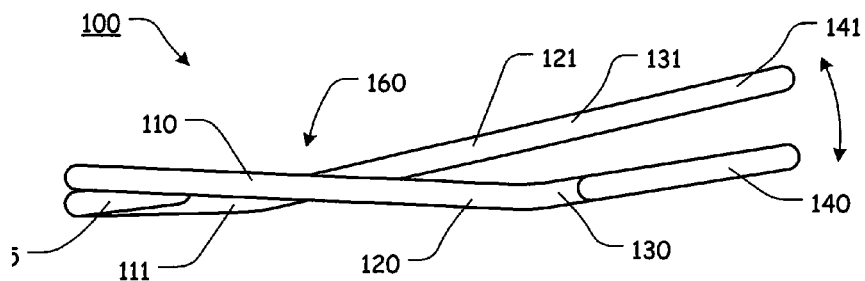
FIG. 7 shows a left side view of a first exemplary embodiment of releasable clip, wherein the releasable clip is in an open position, according to this invention.
Figure 8:
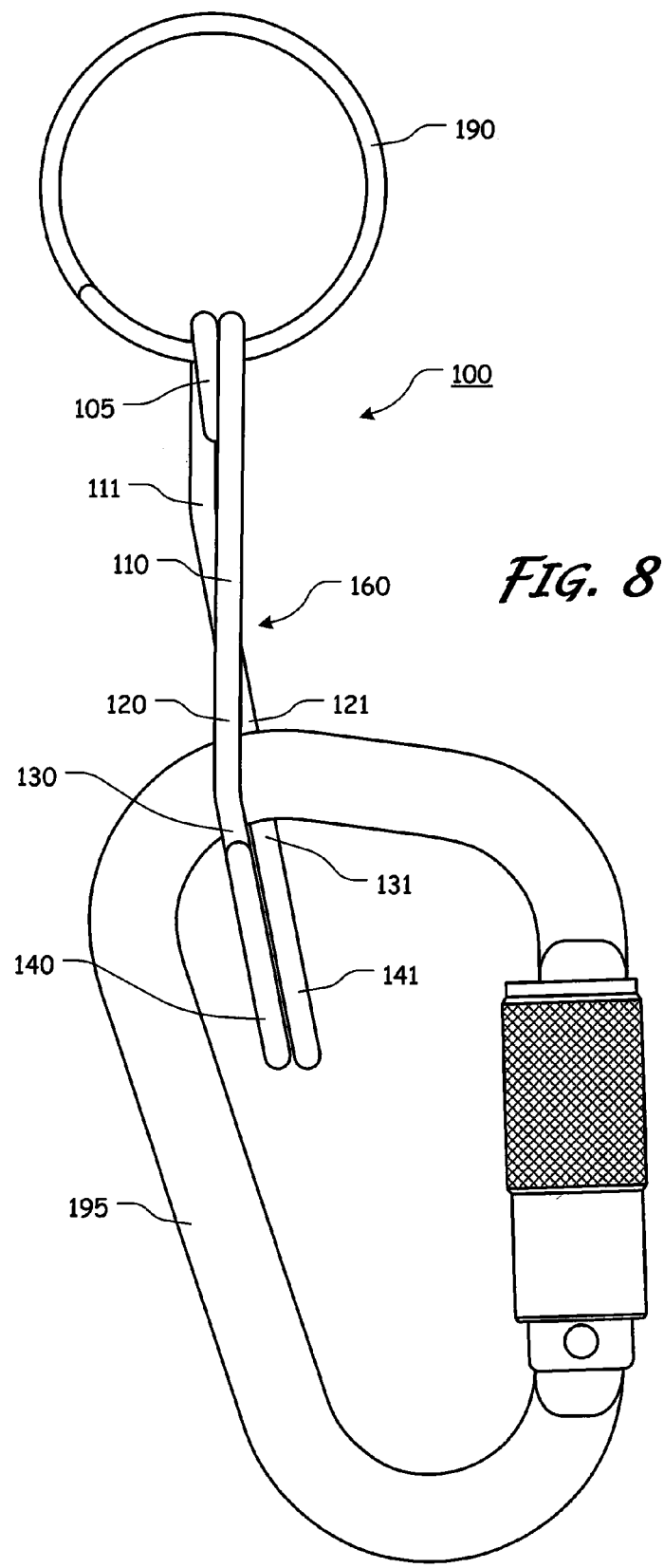
FIG. 8 shows a left side view of a first exemplary embodiment of releasable clip, wherein an exemplary ring and carabiner are attached to the releasable clip and the releasable clip is in a closed position, according to this invention.
Figure 9:
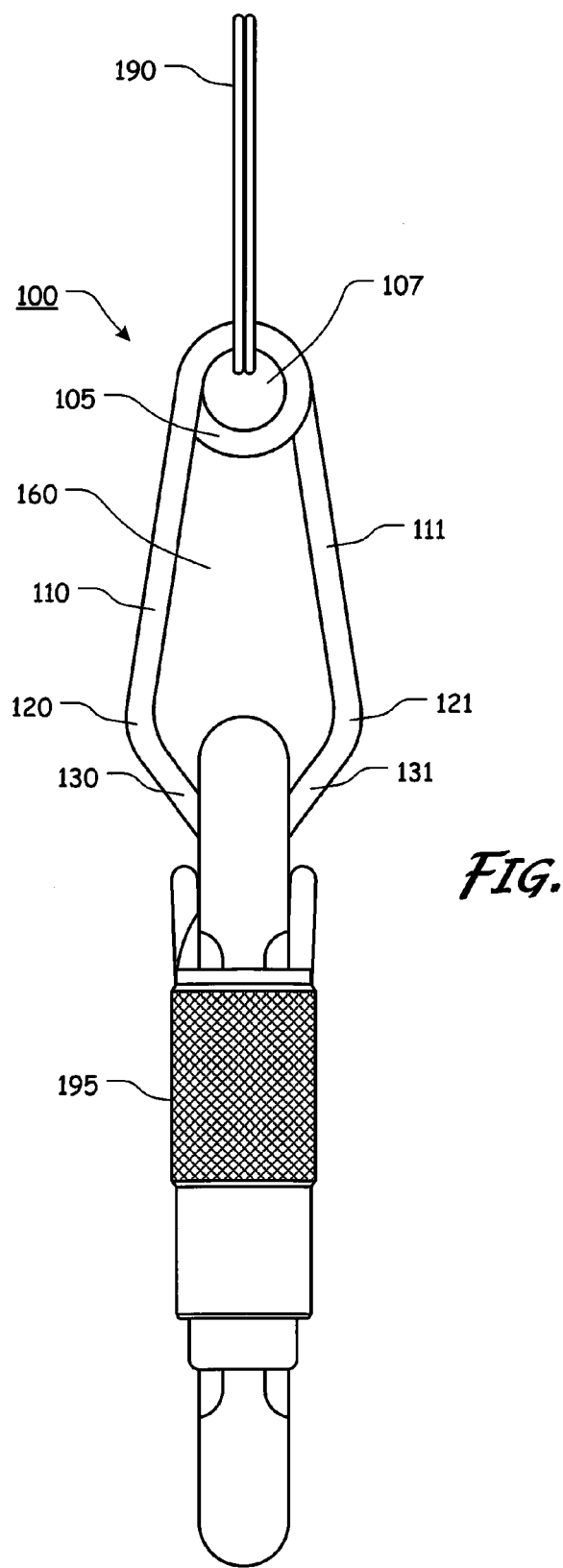
FIG. 9 shows a front view of a first exemplary embodiment of releasable clip, wherein an exemplary ring and carabiner are attached to the releasable clip and the releasable clip is in a closed position, according to this invention.

A second item, such as exemplary carabiner 195, can be releasably attached to the releasable clip 100, via primary loop 160. The carabiner 195 (or other second item) can be releasably attached within the primary loop 160 by being threaded through the primary loop 160 or by having relevant portions of the releasable clip 100 urged from a closed position, as illustrated in FIGS. 3 and 4, to an open position, as illustrated in FIGS. 7 and 10 so as to allow the carabiner 195 to be positioned within the primary loop 160.

Once the carabiner 195 is positioned within the primary loop 160, it will be maintained within the primary loop 160 until a sufficient amount of withdrawing force is applied to the carabiner 195 to overcome the spring bias or resilience of components of the releasable clip 100 and urge the leg portions 130 and 131 from their closed position for a sufficient amount to allow the carabiner 195 to be withdrawn from the primary loop 160.

Because at least portions of arch portions 140 and 141 follow substantially parallel planes $P_{L110}$ and $P_{L111}$. Therefore, the carabiner 195 can be more easily removed from the primary loop 160 when the carabiner is rotated, as illustrated in FIG. 10, and a withdrawing force is applied to the carabiner 195, as illustrated in FIG. 11.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary, non-limiting embodiments for various applications without departing from the spirit and scope of the invention and elements or methods similar or equivalent to those described herein can be used in practicing the present invention. Any and all such changes, variations, modifications, and/or adaptations should and are intended to be comprehended within the meaning and range of equivalents of the disclosed exemplary embodiments and may be substituted without departing from the true spirit and scope of the invention.

In addition, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A releasable clip, comprising:
    a coil;
    a first arm portion and a second arm portion, wherein the arm portions initially extend from the coil in substantially parallel planes, and wherein each arm portion initially extends away from a longitudinal axis of the releasable clip, and wherein each arm portion extends from the coil to a respective shoulder portion, wherein after extending a determined second distance from the coil, the first arm portion bends away from a first plane and extends along a second plane, and wherein after extending a determined first distance from the coil, the second arm portion bends away from a plane substantially parallel to the first plane and extends along a plane substantially parallel to the second plane;
    a first leg portion and a second leg portion, wherein each leg portion extends from a respective shoulder portion, wherein each leg portion initially extends toward and crosses the longitudinal axis of the releasable clip; and
    a first arch portion and a second arch portion, wherein each arch portion extends from a respective leg portion to a respective terminal end.

2. The releasable clip of claim 1, wherein the releasable clip comprises an elongate portion of material.

3. The releasable clip of claim 1, wherein the releasable clip comprises two or more elongate portions of material attached, coupled, or otherwise joining together to form the releasable clip.

4. The releasable clip of claim 1, wherein the coil comprises a loop of material, formed so as to define a coil loop.

5. The releasable clip of claim 1, wherein the first arm portion and the second arm portion are of an equal length.

6. The releasable clip of claim 1, wherein a length of the first arm portion is greater than a length of the second arm portion.

7. The releasable clip of claim 1, wherein a length of the first arm portion is less than a length of the second arm portion.

8. The releasable clip of claim 1, wherein the first leg portion and the second leg portion of are of an equal length.

9. The releasable clip of claim 1, wherein a length of the first leg portion is greater than a length of the second leg portion.

10. The releasable clip of claim 1, wherein a length of the first leg portion is less than a length of the second leg portion.

11. The releasable clip of claim 1, wherein each leg portion crosses the longitudinal axis of the releasable clip and continues to extend away from the longitudinal axis of the releasable clip.

12. The releasable clip of claim 1, wherein an area between a portion of the coil, the arm portions, and at least a portion of the leg portions defines a primary loop.

13. The releasable clip of claim 1, wherein the first plane intersects the second plane at approximately 11°.

14. The releasable clip of claim 1, wherein the first plane intersects the second plane between approximately 5° and 20°.

15. The releasable clip of claim 1, wherein the first plane intersects the second plane between approximately 2° and 30°.

16. The releasable clip of claim 1, wherein the releasable clip comprises an elongate wire-like element having spring or rebounding properties.

17. The releasable clip of claim 1, wherein at least certain portions of the releasable clip are formed of a spring or other resilient material, so as to provide a springing or rebounding force to elements of the releasable clip.

18. The releasable clip of claim 1, wherein at least portions of the arm portions and leg portions can be moved to an open position when an urging force is applied and automatically return to a closed position when the urging force is removed.

19. A releasable clip, comprising:
    an elongate wire-like element extending from a first terminal end to a second terminal end;
    a coil formed in the elongate wire-like element,
    wherein a first arm portion and a second arm portion initially extend from the coil, and wherein each arm portion initially extends away from a longitudinal axis of the releasable clip,
    wherein after extending a determined second distance from the coil, the first arm portion bends away from a first plane and extends along a second plane,
    wherein after extending a determined first distance from the coil, the second arm portion bends away from a plane substantially parallel to the first plane and extends along a plane substantially parallel to the second plane, and wherein the first arm portion extends to a first shoulder portion and the second arm portion extends to a second shoulder portion;
    wherein a first leg portion extends from the first shoulder portion and a second leg portion extends from the second shoulder portion, wherein each leg portion initially extends toward and crosses the longitudinal axis of the releasable clip; and
    a first arch portion extending from the first leg portion to the first terminal end and a second arch portion extending from the second leg portion to the second terminal end.

* * * * *